(12) United States Patent
Hollnbuchner et al.

(10) Patent No.: US 8,388,312 B2
(45) Date of Patent: Mar. 5, 2013

(54) COMPRESSOR FOR AN EXHAUST GAS TURBOCHARGER

(75) Inventors: Bernd Hollnbuchner, Garsten (AT); Herbert Berger, Ried (AT); Daniel Fischer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 65 days.

(21) Appl. No.: 12/605,604

(22) Filed: Oct. 26, 2009

(65) Prior Publication Data
US 2010/0111676 A1 May 6, 2010

Related U.S. Application Data

(63) Continuation of application No. PCT/EP2008/003304, filed on Apr. 24, 2008.

(30) Foreign Application Priority Data

Apr. 27, 2007 (DE) .......................... 10 2007 019 884

(51) Int. Cl.
*F04D 29/30* (2006.01)
(52) U.S. Cl. ....................................... 415/206; 415/119
(58) Field of Classification Search .................. 415/119, 415/205, 206, 914
See application file for complete search history.

(56) References Cited

U.S. PATENT DOCUMENTS

| 5,863,178 A * | 1/1999 | Scheinert et al. | 415/58.4 |
| 6,623,239 B2 * | 9/2003 | Sahay et al. | 415/119 |
| 2006/0275113 A1 * | 12/2006 | Chen | 415/206 |
| 2008/0056882 A1 * | 3/2008 | Clay et al. | 415/55.6 |

FOREIGN PATENT DOCUMENTS

| DE | 196 47 605 C2 | 5/1998 |
| DE | 19727139 A1 | 1/1999 |
| DE | 100 52 893 A1 | 3/2002 |
| DE | 102 23 876 A1 | 12/2003 |
| DE | 103 32 025 A1 | 2/2005 |
| FR | 2 878 914 A1 | 6/2006 |
| WO | WO 02/052110 A1 | 7/2002 |
| WO | WO 2006/090152 A1 | 8/2006 |

OTHER PUBLICATIONS

International Search Report dated Aug. 11, 2008 with English translation (six (6) pages).
German Search Report mailed Apr. 19, 2012.

* cited by examiner

*Primary Examiner* — Edward Look
*Assistant Examiner* — Liam McDowell
(74) *Attorney, Agent, or Firm* — Crowell & Moring LLP

(57) ABSTRACT

A compressor for an exhaust gas turbocharger includes an exhaust gas turbocharger housing having a gas intake port, which substantially radially encloses a gas inflow area. Disposed in the exhaust gas turbocharger housing is a compressor wheel, which can be driven by an exhaust gas turbine. The compressor wheel bounds the gas inflow area in the gas intake port in the direction of flow of a gas. The gas intake port includes indentations on a side of the inflow area. The flow noise in normal operation of the compressor and the acoustic effect in the case of pumping are reduced with the indentations.

5 Claims, 1 Drawing Sheet

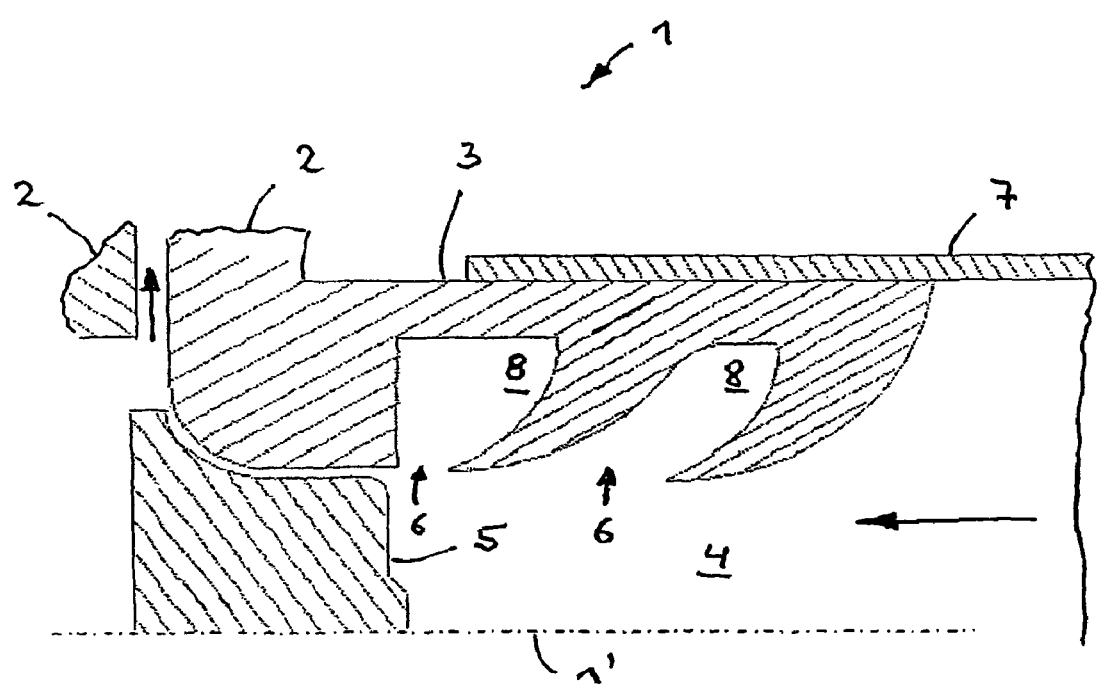

COMPRESSOR FOR AN EXHAUST GAS TURBOCHARGER

CROSS-REFERENCE TO RELATED APPLICATIONS

This application is a continuation of PCT International Application No. PCT/EP2008/003304, filed Apr. 24, 2008, which claims priority under 35 U.S.C. §119 to German Patent Application No. DE 10 2007 019 884.3, filed Apr. 27, 2007, the entire disclosures of which are herein expressly incorporated by reference.

BACKGROUND AND SUMMARY OF THE INVENTION

The invention relates to a compressor for an exhaust gas turbocharger, in which an exhaust gas turbocharger housing includes a gas intake port which substantially radially encloses a gas inflow area. Disposed in the exhaust gas turbocharger housing is a compressor wheel, which can be driven by an exhaust gas turbine.

For example, from DE 100 52 893 A1 there is known a device for improving the efficiency of fluid flow devices, preferably those installed in motor engines. The fluid flow device is an exhaust gas turbocharger in whose exhaust gas turbocharger housing there is disposed a compressor wheel, which can be driven by an exhaust gas turbine. In the area for the inflow of fresh gas into the compressor, the exhaust gas turbocharger housing includes a gas intake port. In order to improve the efficiency of the exhaust gas turbocharger, the gas intake port and a clean air tube disposed in front of the port in the direction of flow, have shapes optimized for flow, that is, the intake contour consists of substantially smooth and round surfaces.

However, it is disadvantageous in the known surface configuration of the gas inflow contour that, despite the surfaces being favorable to flow, disturbing flow noise can occur, in particular on reaching the pumping limit.

Furthermore, from German Patent Specification DE 196 47 605 C2, from which this invention proceeds, a compressor of an exhaust gas turbocharger is known, which basically has the same design as the compressor from the German Laid-Open Publication DE 100 52 893 A1. Unlike the compressor mentioned in the introduction, the gas intake port from DE 196 47 605 C2 includes a radially running annular gap whose flow cross section can be changed in or opposite to the direction of flow by moving a tube disposed in the annular gap. Through this relatively laborious measure the result is obtained that retaining a desirable expansion of the operating limits of the compressor, i.e., an increase of the pumping limit of the compressor, is possible without disturbing noise.

However, a disadvantage in that described arrangement is the great complexity of the construction which is necessary to reduce the noise emissions.

It is the object of the invention to provide a simple measure with which noise, in particular in the range of the pumping limit, can be reduced or eliminated without, at the same time, accepting loss of efficiency of the exhaust gas turbocharger.

This object is realized by a compressor for an exhaust gas turbocharger in which an exhaust gas turbocharger housing includes a gas intake port which substantially radially encloses a gas inflow area. Disposed in the exhaust gas turbocharger housing is a compressor wheel, which can be driven by an exhaust gas turbine. The compressor wheel bounds the gas inflow area in the gas intake port in the direction of flow of a gas. The gas intake port includes indentations on the side of the inflow area.

Through the arrangement according to the invention, the following three different advantageous effects are achieved.

1. Acoustics:
The flow noise itself in normal operation, and the acoustic effects in the case of pumping, are clearly reduced.

2. Flow:
The oscillations in air mass during pumping are clearly reduced in the inflow area, and the intake flow is clearly made uniform in normal operation.

3. Costs:
The arrangement according to the invention can be integrated into existing technology in a particularly simple manner and large-volume and expensive resonators in the air duct can be eliminated.

The location of the indentations is advantageously in an area which can be machined in a particularly simple manner. In particularly preferred embodiments, the indentations are formed as holes or radially running grooves. Advantageously, the indentations project between 0.5 mm and 5 mm into the gas intake port. The indentations advantageously have a diameter or a width between 0.5 mm and 10 mm. These particularly preferred ranges help achieve the advantages noted above.

An additional improvement of the effect according to the invention is achieved by an arrangement wherein the indentations include a back-cut opposite to the flow direction. The indentations are advantageously arranged so as to be distributed with either a uniform or a non-uniform spacing.

In particularly preferred production processes, the indentations are produced with or without machining.

In an arrangement that can be upgraded in a particularly simple manner, the indentations are disposed in a separate tube, which can be introduced into the gas intake port. The arrangement is also a realization which can be upgraded in a particularly simple manner.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a cross-sectional view through a gas inflow area arranged according to the invention for a compressor of an exhaust gas turbocharger.

DETAILED DESCRIPTION OF THE DRAWING

FIG. 1 is a cross-sectional view through half of a gas inflow area 4 for a compressor 1 of an exhaust gas turbocharger. The sectional faces are represented with hatching. The gas inflow area 4 of the compressor 1 is disposed radially symmetrically about an axis 1' of the exhaust gas turbocharger and has at its radially outside boundary a gas intake port 3 of an exhaust gas turbocharger housing 2. A gas inflow direction is represented schematically by arrows. A clean air tube 7 is pushed on over the gas intake port 3 radially to the outside. In the exhaust gas turbocharger housing 2, a compressor wheel 5, driven by an exhaust gas turbine (not shown here), rotates radially symmetrically about the axis 1' in order to convey gas coming from the clean air tube 7 and the gas intake port 3 radially on the outside into a compressor screw (not shown) of the compressor 1. The gas inflow area 4 is bounded in the flow direction of the gas by the compressor wheel 5. According to an exemplary embodiment, the gas intake port 3 includes radially extending indentations 6, which in the particularly preferred embodiment example have back-cuts 8 opposite to the direction of flow of the gas.

Deviating from this particularly preferred embodiment example, the indentations 6 can also be simple holes or radially running grooves, which are provided in the gas intake port in the direction of flow up to the compressor wheel 5.

A particularly preferred depth of the indentations 6 is between 0.5 mm and 5 mm since in this range the mechanical strength of the gas intake port 3 is not significantly affected. Furthermore, the indentations 6 preferably have a diameter, or in the direction of flow of the gas a width, between 0.5 mm and 10 mm. Furthermore, the indentations 6 can be distributed with a uniform or non-uniform spacing, that is, stochastically in the gas inflow area 4. Furthermore, the indentations 6 can be produced by machining or without machining. The machine processing can, for example, be done by turning or milling. In the case of production without machining, casting processes are preferably used. In a further embodiment, the indentations 6, regardless in which of the aforesaid embodiments, can also be disposed in a separate tube, which can be introduced into the gas intake port 3.

In the following, the invention will be explained again in other words with the aid of the particularly preferred embodiment example shown.

A base contour, which is optimized for flow, is retained in principle for the compressor 1, but is modified by radial back-cuts 8, where these can also be embodied as simple grooves or holes. These indentations 6 can be manufactured with machine processing, by pushing in inserts, or also by casting technology.

The back-cuts 8 are, as a matter of principle, not located in the area of the compressor blades but rather in the compressor inlet. They are thus not a type of bypass, as is known from the state of the art, said state of the art being cited above and having the known acoustic weaknesses.

Acoustic effect: The sound waves arising at the blades of the compressor wheel 5, and also the reflected sound waves, arrive in part in the back-cuts 8 and are reflected there, even repeatedly. In recombination with the direct wave, a temporal widening and, associated with this, an attenuation of the shock waves is the overall result.

Fluidic effect: In normal operation the inflowing air is hardly affected in comparison to the original geometry. In the case of pumping the back-flowing air arrives in the back-cut or in the indentation 6, where it rotates along the periphery. The overall result is greater resistance to back-flow, which weakens the pumping in duration and amplitude. The pumping limit of the compressor 1 is not altered by the indentations 6.

Thus, there are advantages in the following areas:

Acoustics: Flow noise in normal operation, and acoustic effects in the case of pumping, are reduced.

Flow: The oscillation in air mass is reduced during pumping and the intake flow is made uniform in normal operation.

Costs: The arrangement according to the invention can be integrated into existing technology, and large-volume and expensive resonators in the air duct can be eliminated.

TABLE OF REFERENCE NUMBERS

1 Compressor
1' Axis
2 Exhaust gas turbocharger housing
3 Gas intake port
4 Gas inflow area
5 Compressor wheel
6 Indentations
7 Clean air tube
8 Back cut The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A compressor for an exhaust gas turbocharger, comprising:
an exhaust gas turbocharger housing having a gas intake port substantially radially enclosing a gas inflow area;
a compressor wheel disposed in the exhaust gas turbocharger housing, the compressor wheel bounding the gas inflow area in the gas intake port in a flow direction of a gas and being drivable by an exhaust gas turbine; and
indentations of the gas intake port located on a side of the gas inflow area, wherein the indentations are radially extending grooves configured as back cuts in the flow direction with gas inlet and outlet regions upstream of the compressor wheel and extend into a wall of the gas intake port to form a void space radially outside of the gas intake port, wherein a cross-section of an opening of the indentation at the gas intake port wall is smaller than a largest cross-section of the void space radially outside the gas intake port wall.

2. The compressor according to claim 1, wherein the indentations project into the gas intake port between 0.5 mm and 5 mm.

3. The compressor according to claim 1, wherein the indentations have a width of between 0.5 mm and 10 mm.

4. The compressor according to claim 1, wherein the indentations are distributed uniformly about the gas intake port.

5. The compressor according to claim 1, wherein the indentations are machined indentations formed in the gas intake port.

* * * * *